US012792952B2

(12) United States Patent
Griffin et al.

(10) Patent No.: US 12,792,952 B2
(45) Date of Patent: Nov. 10, 2026

(54) MANAGING ACCESS TO QUANTUM SERVICES IN QUANTUM COMPUTING DEVICES

(71) Applicant: Red Hat, Inc., Raleigh, NC (US)

(72) Inventors: Leigh Griffin, Waterford (IE); Stephen Coady, Waterford (IE)

(73) Assignee: Red Hat, LLC, Raleigh, NC (US)

( * ) Notice: Subject to any disclaimer, the term of this patent is extended or adjusted under 35 U.S.C. 154(b) by 1289 days.

(21) Appl. No.: 17/685,021

(22) Filed: Mar. 2, 2022

(65) Prior Publication Data

US 2023/0281500 A1 Sep. 7, 2023

(51) Int. Cl.
*G06N 10/80* (2022.01)
*G06N 10/20* (2022.01)

(52) U.S. Cl.
CPC ............. *G06N 10/80* (2022.01); *G06N 10/20* (2022.01)

(58) Field of Classification Search
None
See application file for complete search history.

(56) References Cited

U.S. PATENT DOCUMENTS 10,127,499 B1 11/2018 Rigetti et al.
10,826,845 B2 11/2020 Dadashikelayeh et al.
10,977,570 B2 4/2021 Smith et al.
11,270,220 B1 * 3/2022 Richardson ........... G06F 9/5044
2006/0101236 A1 5/2006 Han
2007/0239366 A1 10/2007 Hilton et al.
2009/0070402 A1 3/2009 Rose et al.
2023/0153155 A1 * 5/2023 Krneta .................. G06N 10/80
718/104

OTHER PUBLICATIONS

Hlukhov, V. et al., "FPGA-Based Digital Quantum Coprocessor," Advances in Cyber-Physical Systems, vol. 3, No. 2, 2018, http://science.lpnu.ua/sites/default/files/journal-paper/2019/jul/17145/volum3number2text-15-31.pdf, pp. 67-83.
Sullivan, S. et al., "Quantum Emulation Co-processor Circuit Card," Navy STTR 2020, Topic N20A-T016, Jan. 14, 2020, https://www.navysbir.com/n20_A/N20A-T016.htm , 2 pages.
Krupansky, J. et al., "What Applications Are Suitable for a Quantum Computer?" Apr. 30, 2019, https://Jackkrupansky.medium.com/what-applications-are-suitable-for-a-quantum-computer-5584ef62c38a, 20 pages.

* cited by examiner

*Primary Examiner* — Eric C Wai
(74) *Attorney, Agent, or Firm* — Dority & Manning, P.A.

(57) ABSTRACT

Managing access to quantum services in quantum computing devices is disclosed herein. In one example, a processor device of a classical computing device identifies a quantum computing device communicatively coupled to the classical computing device, and obtains quantum computing device metadata for the quantum computing device. Based on the quantum computing device metadata, the processor device identifies one or more quantum services provided by the quantum computing device, and generates a quantum computing device (QCD) profile for the quantum computing device, a QCD access Application Programming Interface (API) for the quantum computing device, and one or more quantum service APIs corresponding to the one or more quantum services. In this manner, access to quantum service functionality by classical applications may be facilitated and managed.

20 Claims, 8 Drawing Sheets

MANAGING ACCESS TO QUANTUM SERVICES IN QUANTUM COMPUTING DEVICES

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices to provide desired functionality. As quantum computing continues to increase in popularity and become more commonplace, functionality for managing access to quantum services by applications executing on classical computing devices will be desirable.

SUMMARY

The examples disclosed herein manage access to quantum services in quantum computing devices. In one example, a Quantum Coprocessor (QCP) service, executing on a classical computing device, provides a mechanism for identifying quantum computing devices and quantum services provided thereby, and generating quantum computing device (QCD) profiles, QCD access Application Programming Interfaces (APIs), and quantum service APIs corresponding to the quantum services. Applications executing on the classical computing device can subsequently access the functionality of the quantum services using the QCD profiles, QCD access APIs, and quantum service APIs. In this manner, access to quantum service functionality by classical applications may be facilitated and managed.

In another example, a method for managing access to quantum services in quantum computing devices is disclosed. The method comprises identifying, by a classical computing device, a quantum computing device communicatively coupled to the classical computing device. The method further comprises obtaining, by the classical computing device, quantum computing device metadata for the quantum computing device. The method also comprises identifying, by the classical computing device based on the quantum computing device metadata, one or more quantum services provided by the quantum computing device. The method additionally comprises generating, by the classical computing device, a QCD profile for the quantum computing device, a QCD access API for the quantum computing device, and one or more quantum service APIs corresponding to the one or more quantum services.

In another example, a computing system for managing access to quantum services in quantum computing devices is disclosed. The computing system includes a classical computing device that comprises a system memory, and a processor device communicatively coupled to the system memory. The processor device is to identify a quantum computing device communicatively coupled to the classical computing device. The processor device is further to obtain quantum computing device metadata for the quantum computing device. The processor device is also to identify, based on the quantum computing device metadata, one or more quantum services provided by the quantum computing device. The processor device is additionally to generate a QCD profile for the quantum computing device, a QCD access API for the quantum computing device, and one or more quantum service APIs corresponding to the one or more quantum services.

In another example, a non-transitory computer-readable medium for managing access to quantum services in quantum computing devices is disclosed. The non-transitory computer-readable medium stores thereon computer-executable instructions that, when executed, cause one or more processor devices to identify a quantum computing device communicatively coupled to a classical computing device. The computer-executable instructions further cause the one or more processor devices to obtain quantum computing device metadata for the quantum computing device. The computer-executable instructions also cause the one or more processor devices to identify, based on the quantum computing device metadata, one or more quantum services provided by the quantum computing device. The computer-executable instructions additionally cause the one or more processor devices to generate a QCD profile for the quantum computing device, a QCD access API for the quantum computing device, and one or more quantum service APIs corresponding to the one or more quantum services.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
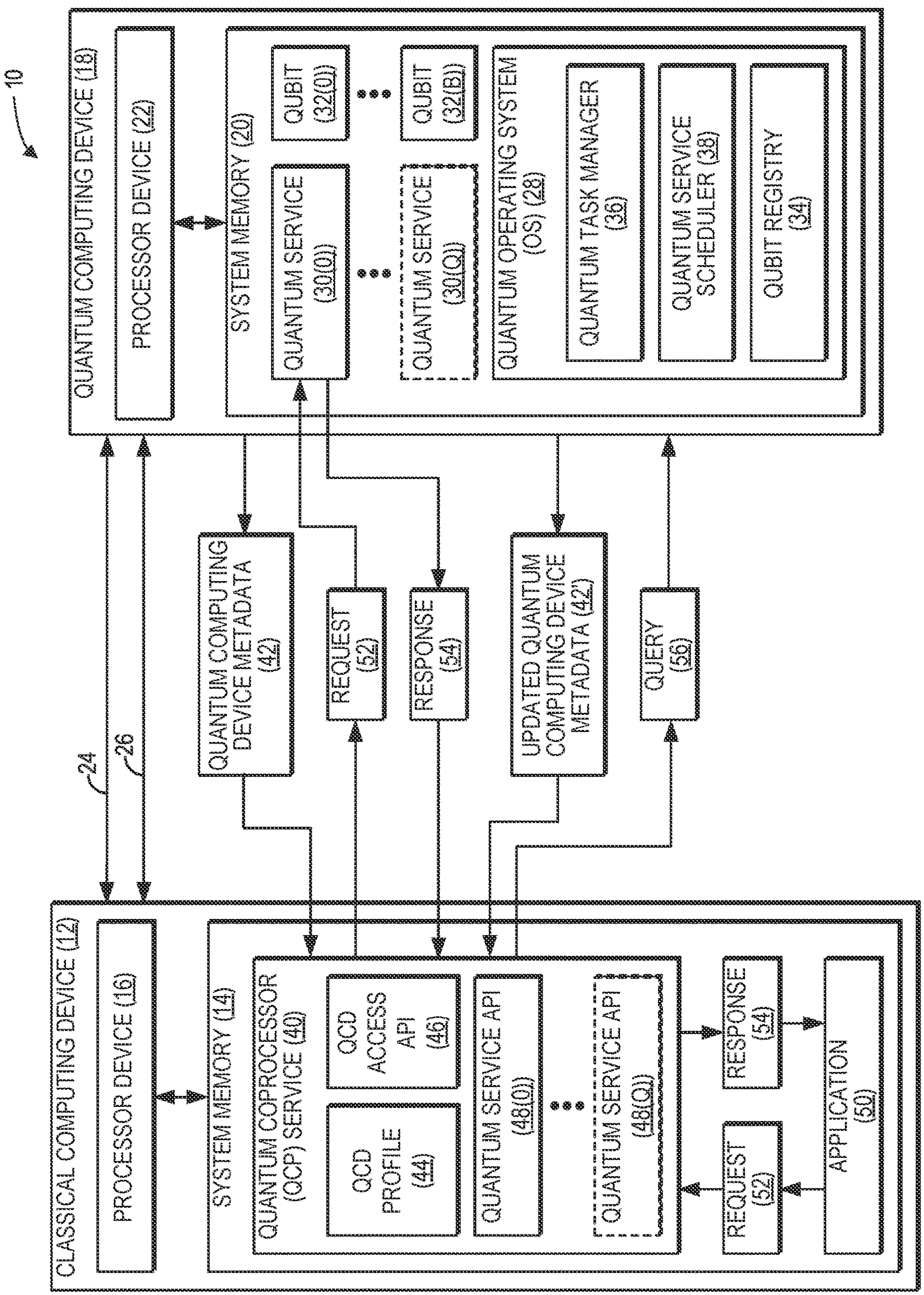
FIG. 1 is a block diagram of a computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first quantum service" and "second quantum service," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," each of which has properties (such as superposition and entanglement) that differ from those of classical (i.e., non-quantum) bits used in classical computing. Qubits may be employed by quantum services that are executed by quantum computing devices to provide desired functionality. In conventional use, a quantum service is employed by a classical application, executing on classical computing devices, that performs pre-processing and data preparation tasks, invokes the functionality of the quantum service, and receives and stores the results of the quantum service invocation. In this manner, the quantum computing device providing the quantum service may effectively act as a "quantum coprocessor" operating in conjunction with the classical computing device. As quantum computing continues to increase in popularity and become more commonplace, functionality for managing access to quantum services by classical applications employing the "quantum coprocessor" paradigm will be desirable.

In this regard, examples disclosed herein implement a Quantum Coprocessor (QCP) service for managing access to quantum services in quantum computing devices. The QCP service is executed by a processor device of a classical computing device that is communicatively coupled to a quantum computing device, and serves as an Application Programming Interface (API) gateway to manage access to quantum services provided by the quantum computing device by classical applications executing on the classical computing device. In exemplary operation, the QCP service identifies the quantum computing device, and obtains quantum computing device metadata for the quantum computing device. The quantum computing device metadata may include data provided by the quantum computing device regarding the quantum computing device's available resources, location, and supported quantum services. Thus, the quantum computing device metadata, in some examples, may comprise an identification of a quantum service, an indication of a current availability of a quantum resource (e.g., qubits), a route between the classical computing device and the quantum computing device, a current availability of a processing resource of the quantum computing device, and/or a current availability of a hardware resource of the quantum computing device, as non-limiting examples. The QCP service according to some examples may obtain the quantum computing device metadata by querying a quantum operating system (OS) of the quantum computing device, or by querying elements of the quantum computing device such as a quantum task manager, a quantum service scheduler, and/or a qubit registry, as non-limiting examples.

Based on the quantum computing device metadata, the QCP service identifies one or more quantum services provided by the quantum computing device. The QCP service then generates a quantum computing device (QCD) profile for the quantum computing device, a QCD access API for the quantum computing device, and one or more quantum service APIs corresponding to the one or more quantum services. The phrase "QCD access API" and derivatives thereof are used herein to refer to an intermediate layer that provides a set of rules for authenticating clients seeking to access the quantum computing device, and for routing requests to the quantum computing device. As used herein, the phrase "quantum service API" and derivatives thereof refer to an intermediate layer that provides a set of rules that define how quantum service functionality is accessed by clients. The QCD access API and the quantum service APIs may be generated based on data obtained directly as part of the quantum computing device metadata, and/or may be based on additional queries performed by the QCP service based on the quantum computing device metadata. For example, the QCP service may use an identification of a quantum service provided as part of the quantum computing device metadata to query the quantum OS or an element thereof (such as a registry or a quantum service manifest) to obtain information for use in generating a quantum service API corresponding to the quantum service.

Once the QCD profile, the QCD access API, and the one or more quantum service APIs have been generated, the QCP service then acts as an API gateway for managing access to the quantum services. In some examples, the QCP service may enable an application to be executed on the classical computing device to be bound to a quantum service API. Binding the application to the quantum service API may include, for instance, authenticating the application and determining a most appropriate network route (e.g., via classical communications link or quantum channel) between the classical computing device and the quantum computing device based on the QCD access API.

Upon execution of the application, the QCP service may receive a request from the application via the quantum service API. In examples in which the quantum computing device is one of multiple quantum computing devices providing the quantum service, the QCP service may select the most appropriate quantum computing device to service the request (e.g., based on the QCD profile obtained from each quantum computing device). In this manner, the QCP service may perform a load balancing function for distributing requests among the multiple quantum computing devices. Alternatively, the application itself may use QCD profiles to select a quantum computing device to service the request (e.g., by including an identification of the quantum computing device as part of the request). The QCP service then transmits the request to the quantum service corresponding to the quantum service API, according to the requirements of the quantum service API. Some examples may provide that the QCP service may subsequently receive a response from the quantum service and may transmit the response to the application.

Some examples may further provide that the QCP service may update the QCD profile, the QCD access API, and/or the one or more quantum service APIs upon detecting a configuration change (e.g., a change in an availability of a quantum resource, a processing resource, and/or a hardware resource) for the quantum computing device. In such examples, the QCP service may detect the change in configuration, and, in response, may obtain updated quantum computing device metadata from the quantum computing device and update the QCD profile, the QCD access API, and/or the one or more quantum service APIs based on the updated quantum computing device metadata. The QCP service may obtain the updated quantum computing device metadata in some examples by receiving the updated quantum computing device metadata from a quantum task manager, a quantum service scheduler, and/or a qubit registry of the quantum computing device (e.g., in response to a query from the QCP service, or transmitted to the QCP service automatically).

FIG. 1 is a block diagram of a computing system 10 according to one example. The computing system 10 includes a classical computing device 12 that comprises a system memory 14 and a processor device 16. The computing system 10 further includes a quantum computing device 18 that comprises a system memory 20 and a processor device 22. The classical computing device 12 and the quantum computing device 18 in the example of FIG. 1 are communicatively coupled via a classical communications link 24, which may comprise a private network or a public network such as the internet. The classical computing device 12 and the quantum computing device 18 are also communicatively coupled to each other and/or to other quantum computing devices (not shown) via a quantum channel 26 over which qubits may be transmitted. It is to be understood that the computing system 10, according to some examples, may include more or fewer quantum computing devices and/or classical computing devices than illustrated in FIG. 1. Additionally, the classical computing device 12 and/or the quantum computing device 18 in some examples may include constituent elements in addition to those illustrated in FIG. 1.

The classical computing device 12 of FIG. 1 operates using non-quantum principles (e.g., by using binary digits that have a value of either zero (0) or one (1), as a non-limiting example). The quantum computing device 18 in FIG. 1 operates in quantum environments but is capable of operating using classical computing principles or quantum computing principles. When using quantum computing principles, the quantum computing device 18 performs computations that utilize quantum-mechanical phenomena, such as superposition and/or entanglement states. The quantum computing device 18 may operate under certain environmental conditions, such as at or near zero degrees (0°) Kelvin. When using classical computing principles, the quantum computing device 18 utilizes binary digits that have a value of either zero (0) or one (1).

In the example of FIG. 1, the quantum computing device 18 executes a quantum OS 28 that provides functionality for managing execution of one or more quantum services 30(0)-30(Q). The one or more quantum services 30(0)-30(Q) comprises a process that employs one or more qubits such as qubits 32(0)-32(B) to perform quantum operations. Each of the one or more quantum services 30(0)-30(Q) is defined by a service definition file (not shown) such as a Quantum Assembly (QASM) file, which comprises quantum programming instructions for allocating and manipulating qubits to achieve a desired functionality. Each of the qubits 32(0)-32(B) may be used to store a data value (not shown), and/or may have a quantum state (not shown) (e.g., spin, as a non-limiting example) into which each of the qubits 32(0)-32(B) is programmatically placed.

To maintain information for qubits such as the qubits 32(0)-32(B), the quantum OS 28 provides a qubit registry 34, which comprises a plurality of qubit registry entries (not shown) that each correspond to a qubit. The qubit registry 34 maintains and provides access to data relating to the qubits implemented by the quantum computing device 18, including a count of the total number of qubits implemented by the quantum computing device 18, and a count of the number of available qubits that are currently available for allocation, as non-limiting examples. Each of the qubit registry entries of the qubit registry 34 also stores qubit metadata for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an entanglement indicator that indicates whether the corresponding qubit is in an entangled state.

Execution of quantum services such as the one or more quantum services 30(0)-30(Q) is facilitated by a quantum task manager 36 and a quantum service scheduler 38, each of which operates in a manner analogous to their conventional classical counterparts. Thus, the quantum task manager 36 of the quantum OS 28 handles operations for creating, monitoring, and terminating quantum services. Likewise, the quantum service scheduler 38 of the quantum OS 28 controls the scheduling of quantum services for execution by the processor device 22, and the allocation of processing resources to executing quantum services. The functionality of the quantum task manager 36 and the quantum service scheduler 38 may be made accessible to other services and processes (e.g., via defined APIs, as a non-limiting example).

As quantum computing continues to increase in popularity and become more commonplace, functionality for managing access to quantum services such as the quantum service(s) 30(0)-30(Q) by classical applications employing the "quantum coprocessor" paradigm will be desirable. Accordingly, in this regard, the processor device 16 of the classical computing device 12 executes a QCP service 40 for managing access to the one or more quantum services 30(0)-30(Q). In exemplary operation, the QCP service 40 identifies the quantum computing device 18 that is communicatively coupled to the classical computing device 12. This may be accomplished, e.g., through the use of conventional network directory functionality available to the classical computing device 12.

The QCP service 40 next obtains quantum computing device metadata 42 for the quantum computing device 18. The quantum computing device metadata 42 in some examples may be obtained by querying the quantum OS 28 of the quantum computing device 18, and/or by querying elements of the quantum computing device 18 such as the quantum task manager 36, the quantum service scheduler 38, and/or the qubit registry 34, as non-limiting examples. The quantum computing device metadata 42 comprises data regarding the available resources, location, and quantum service(s) 30(0)-30(Q) provided by the quantum computing device 18. Thus, the quantum computing device metadata 42 may comprise, as non-limiting examples, an identification of a quantum service, an indication of a current availability of a quantum resource (e.g., the qubits 32(0)-32(B)), a route between the classical computing device 12 and the quantum computing device 18, a current availability of a processing resource of the quantum computing device 18, and/or a current availability of a hardware resource (e.g., memory) of the quantum computing device 18.

Using the quantum computing device metadata 42, the QCP service 40 then identifies the one or more quantum services 30(0)-30(Q) provided by the quantum computing device 18. The QCP service 40 generates a QCD profile 44, a QCD access API 46, and one or more quantum service APIs 48(0)-48(Q) that each correspond to one of the one or more quantum services 30(0)-30(Q). The QCD profile 44 for the quantum computing device 18 may comprise, e.g., information regarding available hardware resources, processing resources, and/or quantum services provided by the quantum computing device 18, and may be used by the QCP service 40 and/or clients to determine whether the quantum computing device 18 can provide a desired functionality. The QCD access API 46 provides a set of rules for authentication of clients to access the quantum computing device 18, as well as information on routing from the classical computing device 12 to the quantum computing device 18. Each of the one or more quantum service APIs 48(0)-48(Q) provides a set of rules that define how the functionality of the corresponding one or more quantum services 30(0)-30 (Q) is accessed by clients.

The QCD profile 44, the QCD access API 46, and the quantum service API(s) 48(0)-48(Q) may be generated based on data obtained directly as part of the quantum computing device metadata 42, and/or may be based on additional queries performed by the QCP service 40 based on the quantum computing device metadata 42. The QCP service 40, for instance, may use an identification of a quantum service provided as part of the quantum computing device metadata 42 to query the quantum OS 28 or an element thereof (such as a registry (not shown) or a quantum service manifest (not shown), as non-limiting examples) to obtain information for use in generating a quantum service API 48(0)-48(Q) corresponding to the quantum service 30(0)-30(Q).

After generating the QCD profile 44, the QCD access API 46, and the one or more quantum service APIs 48(0)-48(Q), the QCP service 40 may then act as an API gateway for managing access to the quantum services 30(0)-30(Q). In some examples, the QCP service 40 may enable an application 50 to be executed on the classical computing device 12 to be bound to one of the quantum service APIs 48(0)-48(Q), such as the quantum service API 48(0) corresponding to the quantum service 30(0). Binding the application 50 to the quantum service API 48(0) may include, for instance, using the QCD access API 46 to authenticate the application 50 and determine a most appropriate network route (e.g., via the classical communications link 24 or the quantum channel 26) between the classical computing device 12 and the quantum computing device 18.

When the application 50 is executed, the QCP service 40 may receive a request 52 from the application 50 via the quantum service API 48(0). If the quantum computing device 18 is one of multiple quantum computing devices providing the quantum service 30(0), the QCP service 40 in some examples may select the quantum computing device 18 as the most appropriate quantum computing device to service the request 52 (e.g., based on the QCD profile 44 for each quantum computing device). The QCP service 40 in such examples may thus perform a load balancing function for distributing requests among the multiple quantum computing devices. Some examples may provide that the application 50 itself may use the QCD profile 44 to select the quantum computing device 18 to service the request 52 (e.g., by including an identification of the quantum computing device 18 as part of the request 52). The QCP service 40 then transmits the request 52 to the quantum service 30(0) corresponding to the quantum service API 48(0), according to the requirements of the quantum service API 48(0). Some examples may provide that the QCP service 40 may subsequently receive a response 54 from the quantum service 30(0) and may transmit the response 54 to the application 50.

According to examples, the QCP service 40 may also update the QCD profile 44, the QCD access API 46, and/or the one or more quantum service APIs 48(0)-48(Q) upon detecting a configuration change for the quantum computing device 18, such as a change in an availability of a quantum resource, a processing resource, and/or a hardware resource. In such examples, the QCP service 40 may detect the change in configuration, and, in response, may obtain updated quantum computing device metadata 42' from the quantum computing device 18. The QCP service 40 may then update the QCD profile 44, the QCD access API 46, and/or one or more of the one or more quantum service APIs 48(0)-48(Q) based on the updated quantum computing device metadata 42'. The QCP service 40 may obtain the updated quantum computing device metadata 42' in some examples by receiving the updated quantum computing device metadata 42' from the quantum task manager 36, the quantum service scheduler 38, and/or the qubit registry 34 of the quantum computing device 18 (e.g., in response to a query 56 from the QCP service 40 or transmitted to the QCP service 40 automatically).

It is to be understood that, because the QCP service 40 is a component of the classical computing device 12, functionality implemented by the QCP service 40 may be attributed to the computing system 10 generally. Moreover, in examples where the QCP service 40 comprises software instructions that program the processor device 16 to carry out functionality discussed herein, functionality implemented by the QCP service 40 may be attributed herein to the processor device 16. It is to be further understood that while, for purposes of illustration only, the QCP service 40 is depicted as a single component, the functionality implemented by the QCP service 40 may be implemented in any number of components, and the examples discussed herein are not limited to any particular number of components. Moreover, it is noted that while, for purposes of illustration and simplicity, the examples are illustrated as being implemented by a processor device set that includes a single processor device on a single computing device, in other environments, such as a distributed and/or clustered environment, the examples may be implemented on a computer system that includes a processor device set that includes a plurality of processor devices of a plurality of different computing devices, and functionality of the examples may be implemented on different processor devices of different computing devices. Thus, irrespective of the implementation, the examples may be implemented on a computer system that includes a processor device set made up of one or more processor devices of one or more computing devices.

Figure 2A:
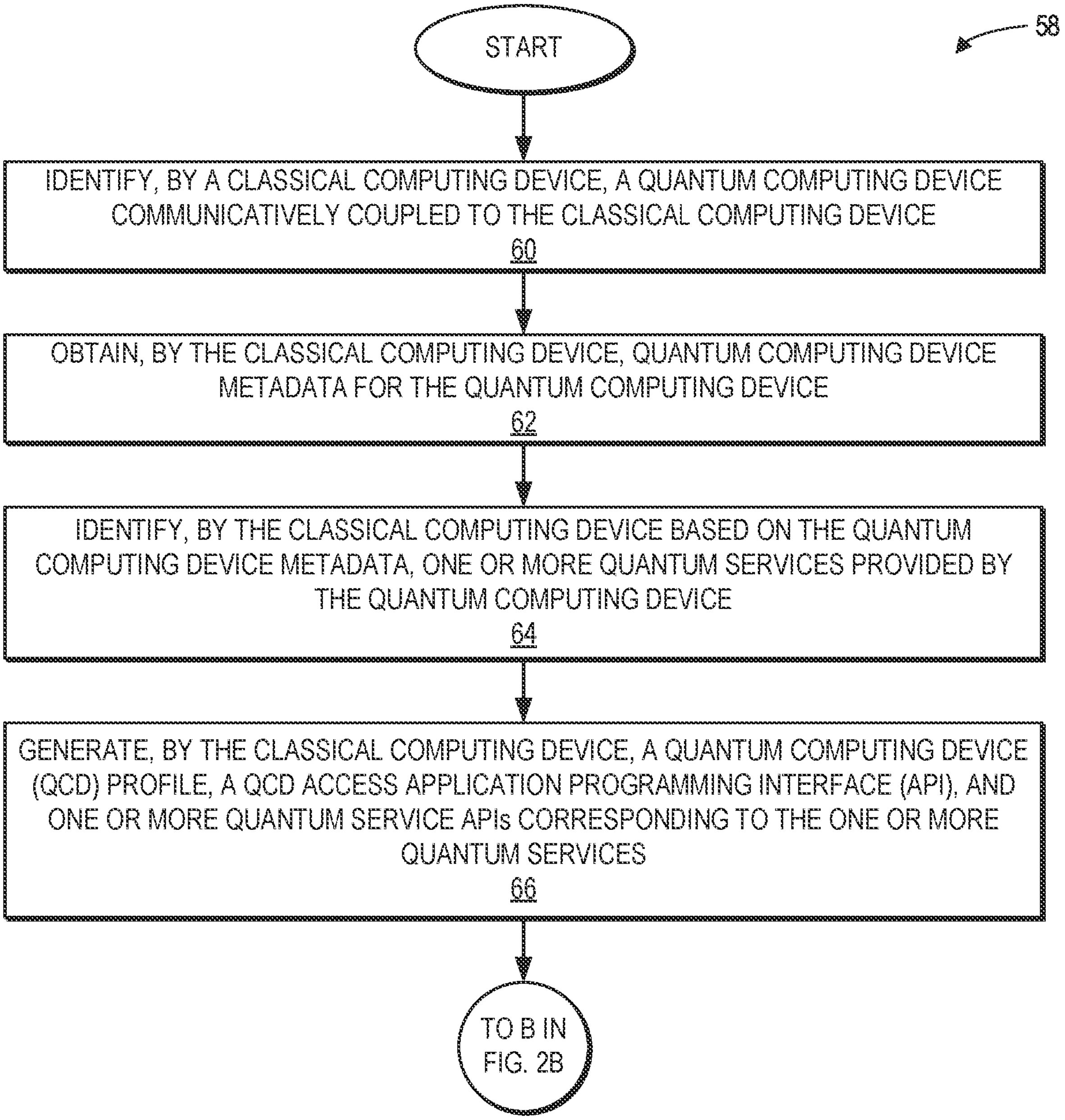
FIGS. 2A-2C are flowcharts illustrating operations performed by the computing system of FIG. 1 for managing access to quantum services in quantum computing devices, according to one example.
Figure 2B:
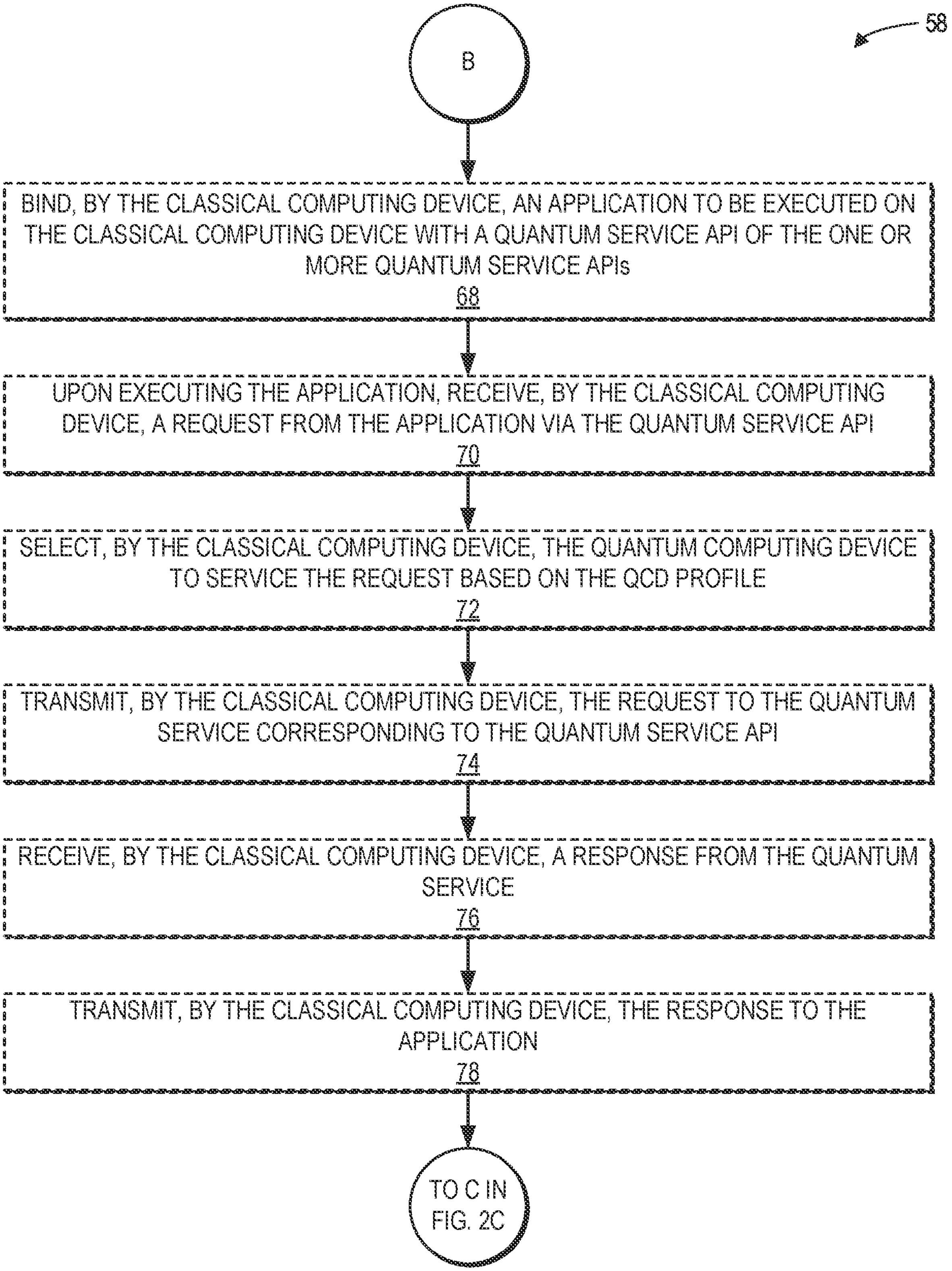
Figure 2C:
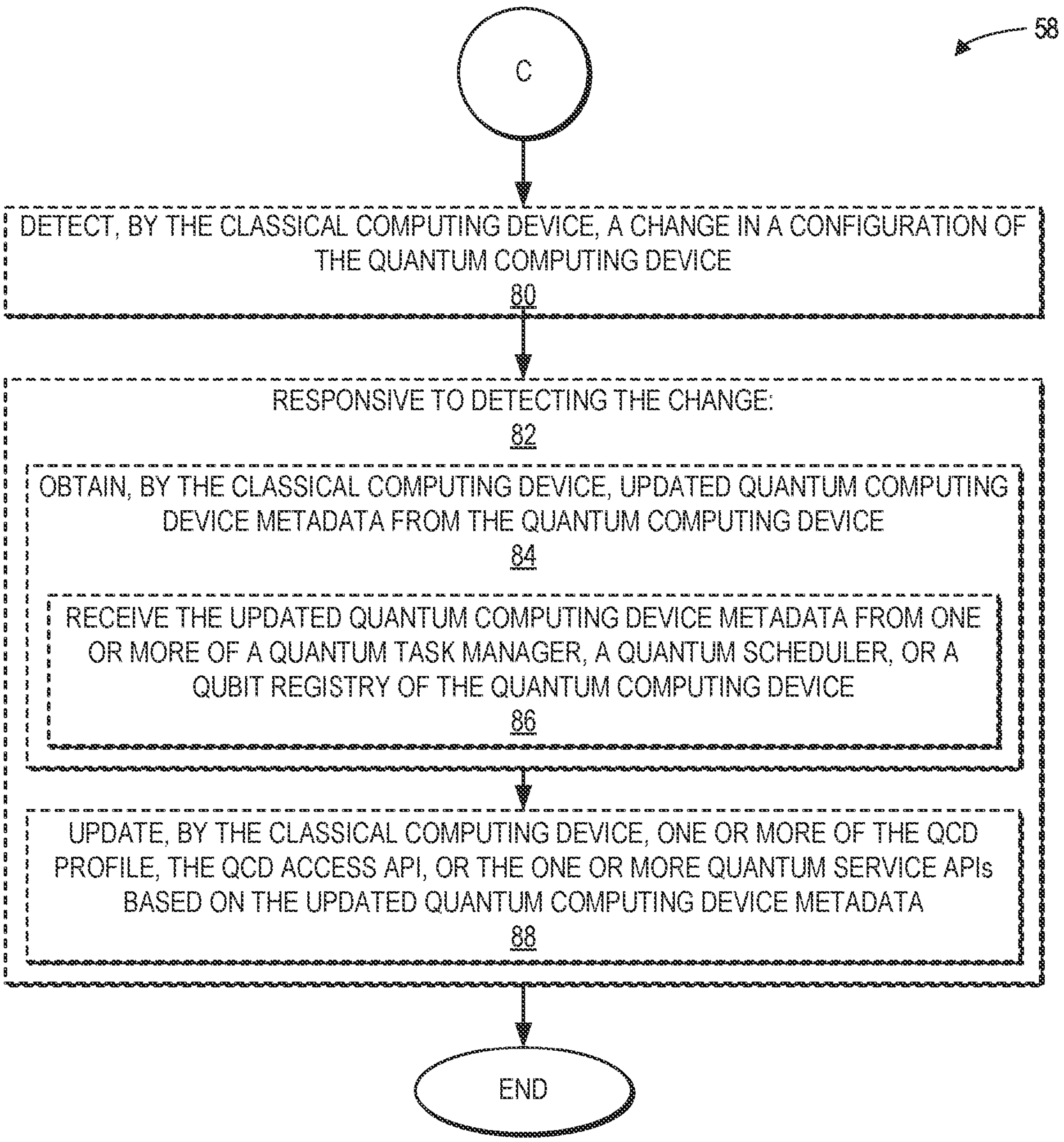

FIGS. 2A-2C provide a flowchart 58 to illustrate exemplary operations performed by the computing system 10 of FIG. 1 for managing access to quantum services in quantum computing devices according to one example. Elements of FIG. 1 are referenced in describing FIGS. 2A-2C for the sake of clarity. It is to be understood that, in some examples, some operations illustrated in FIGS. 2A-2C may be performed in an order other than illustrated herein, and/or may be omitted. In FIG. 2A, operations begin with the processor device 16 of the classical computing device 12 (e.g., by executing the QCP service 40 of FIG. 1) identifies a quantum computing device (e.g., the quantum computing device 18 of FIG. 1) communicatively coupled to the classical computing device 12 (block 60). The QCP service 40 obtains quantum computing device metadata, such as the quantum computing device metadata 42 of FIG. 1, for the quantum computing device 18 (block 62). Based on the quantum computing device metadata 42, the QCP service 40 identifies one or more quantum services (e.g., the one or more quantum services 30(0)-30(Q) of FIG. 1) provided by the quantum computing device 18 (block 64). The QCP service 40 then generates a QCD profile (e.g., the QCD profile 44 of FIG. 1), a QCD access API (e.g., the QCD access API 46 of FIG. 1) and one or more quantum service APIs (e.g., the one or more quantum service APIs 48(0)-48(Q) of FIG. 1) corresponding to the one or more quantum services 30(0)-30(Q) (block 66). Operations in some examples may continue at block 68 of FIG. 2B.

Referring now to FIG. 2B, the QCP service 40 in some examples binds an application (e.g., the application 50 of FIG. 1) to be executed on the classical computing device 12 with a quantum service API (e.g., the quantum service API 48(0) of FIG. 1) of the one or more quantum service APIs 48(0)-48(Q) (block 68). Upon executing the application 50, the QCP service 40 receives a request (e.g., the request 52) from the application 50 via the quantum service API 48(0) (block 70). The QCP service 40 in some examples may select the quantum computing device 18 to service the request 52 based on the QCD profile 44 (block 72). Note that, in some examples, instead of the QCP service 40 selecting the quantum computing device 18, the application 50 may select the quantum computing device 18 to service the request 52 by including an identification of the quantum computing device 18 within the request 52. The QCP service 40 then transmits the request 52 to the quantum service 30(0) corresponding to the quantum service API 48(0) (block 74). In some examples, the QCP service 40 may subsequently receive a response to the request 52 (e.g., the response 54 of FIG. 1) from the quantum service 30(0) (block 76). The QCP service 40 then transmits the response 54 to the application 50 (block 78). Operations in some examples may continue at block 80 of FIG. 2C.

Turning now to FIG. 2C, some examples may provide that the QCP service 40 may detect a change in a configuration of the quantum computing device 18 (block 80). In response to detecting the change in the configuration, the QCP service 40 performs a series of operations (block 82). The QCP service 40 obtains updated quantum computing device metadata (e.g., the updated quantum computing device metadata 42' of FIG. 1) from the quantum computing device 18 (block 84). In some examples, the operations of block 84 for obtaining the updated quantum computing device metadata 42' may comprise receiving the updated quantum computing device metadata 42' from one or more of the quantum task manager 36, the quantum service scheduler 38, or the qubit registry 34 of the quantum computing device 18 (block 86). The QCP service 40 then updates one or more of the QCD profile 44, the QCD access API 46, or the one or more quantum service APIs 48(0)-48(Q) based on the updated quantum computing device metadata 42' (block 88).

Figure 3:
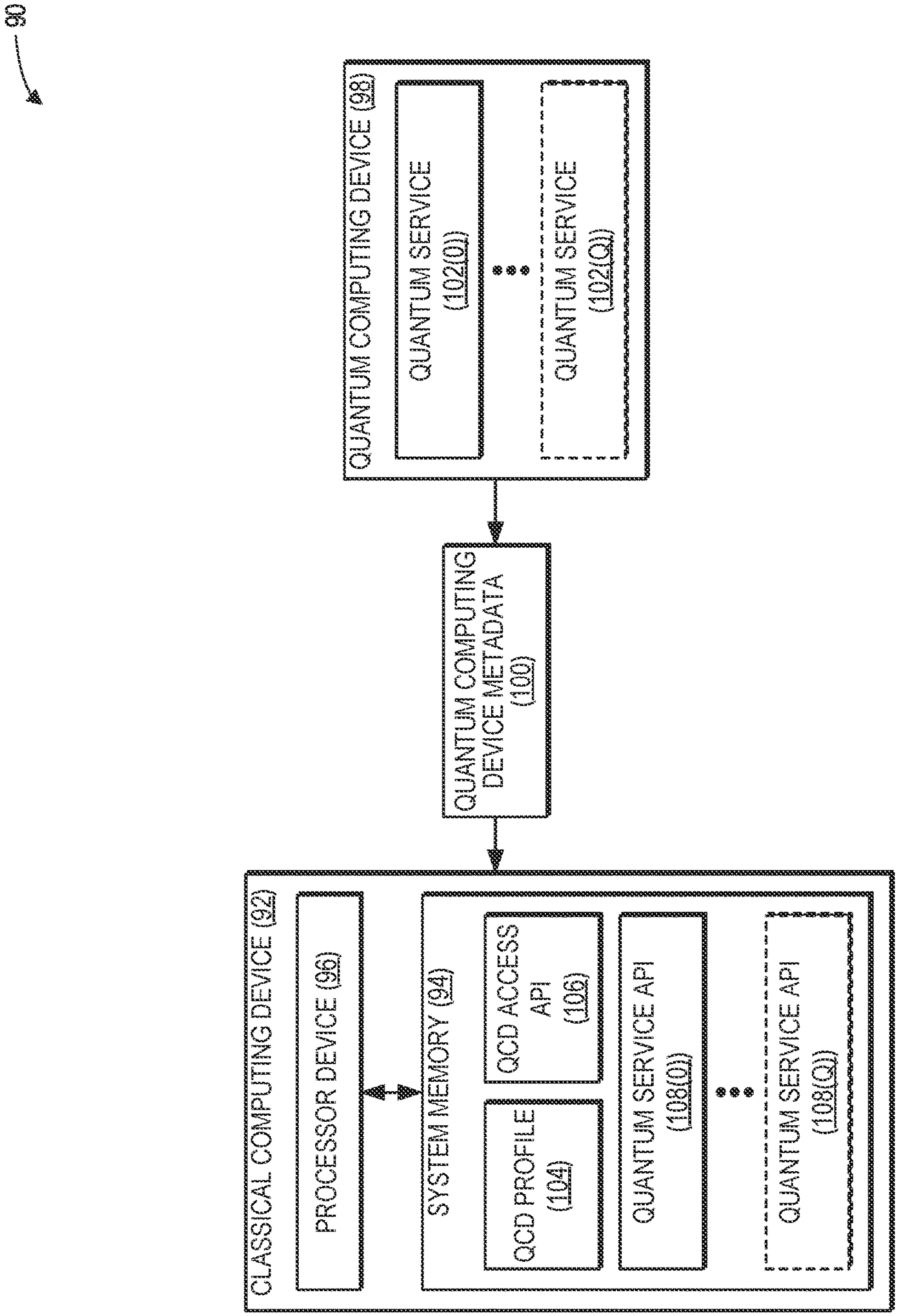
FIG. 3 is a simpler block diagram of the computing system of FIG. 1 for managing access to quantum services in quantum computing devices, according to one example.

FIG. 3 is a simpler block diagram of the computing system 10 of FIG. 1 for managing access to quantum services in quantum computing devices, according to one example. In the example of FIG. 3, a computing system 90 includes a classical computing device 92 that comprises a system memory 94 and a processor device 96. In exemplary operation, the processor device 96 identifies a quantum computing device 98 that is communicatively coupled to the classical computing device 92. The processor device 96 next obtains quantum computing device metadata 100 for the quantum computing device 98. Using the quantum computing device metadata 100, the processor device 96 identifies the one or more quantum services 102(0)-102(Q) provided by the quantum computing device 98. The processor device 96 then generates a QCD profile 104 for the quantum computing device 98, a QCD access API 106 for the quantum computing device 98, and one or more quantum service APIs 108(0)-108(Q) that each correspond to one of the one or more quantum services 102(0)-102(Q).

Figure 4:
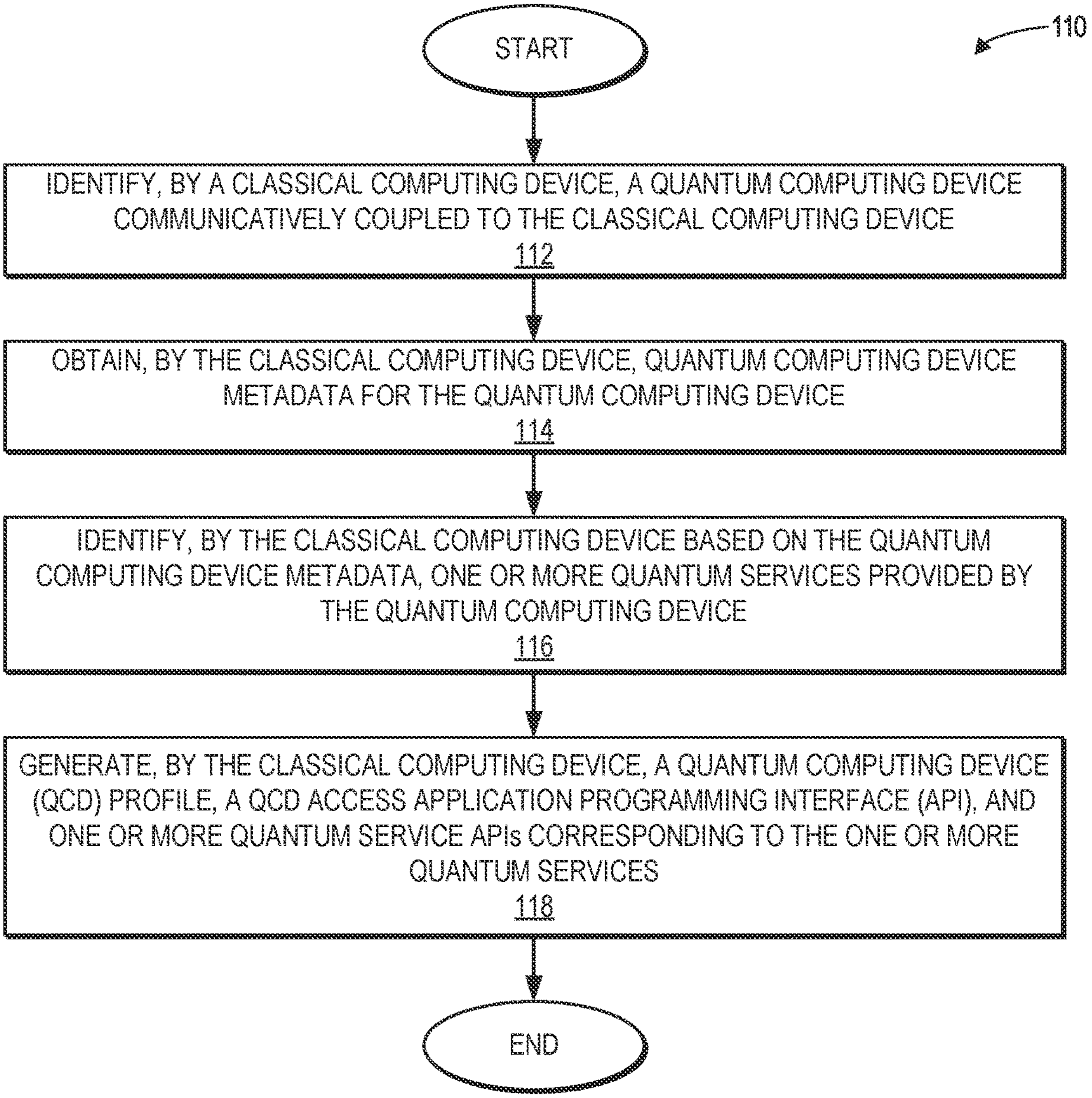
FIG. 4 is a flowchart of a simplified method for managing access to quantum services in quantum computing devices by the quantum computing device of FIG. 3, according to one example.

To illustrate a simplified method for managing access to quantum services in quantum computing devices in the computing system 90 of FIG. 3 according to one example, FIG. 4 provides a flowchart 110. Elements of FIG. 3 are referenced in describing FIG. 4 for the sake of clarity. In FIG. 4, operations begin with the processor device 96 of the classical computing device 92 identifying the quantum computing device 98 communicatively coupled to the classical computing device 92 (block 112). The processor device 96 obtains the quantum computing device metadata 100 for the quantum computing device 98 (block 114). The processor device 96 identifies, based on the quantum computing device metadata 100, the one or more quantum services 102(0)-102(Q) provided by the quantum computing device 98 (block 116). The processor device 96 then generates the QCD profile 104 for the quantum computing device 98, the QCD access API 106 for the quantum computing device 98, and the one or more quantum service APIs 108(0)-108(Q) corresponding to the one or more quantum services 102(0)-102(Q) (block 118).

Figure 5:
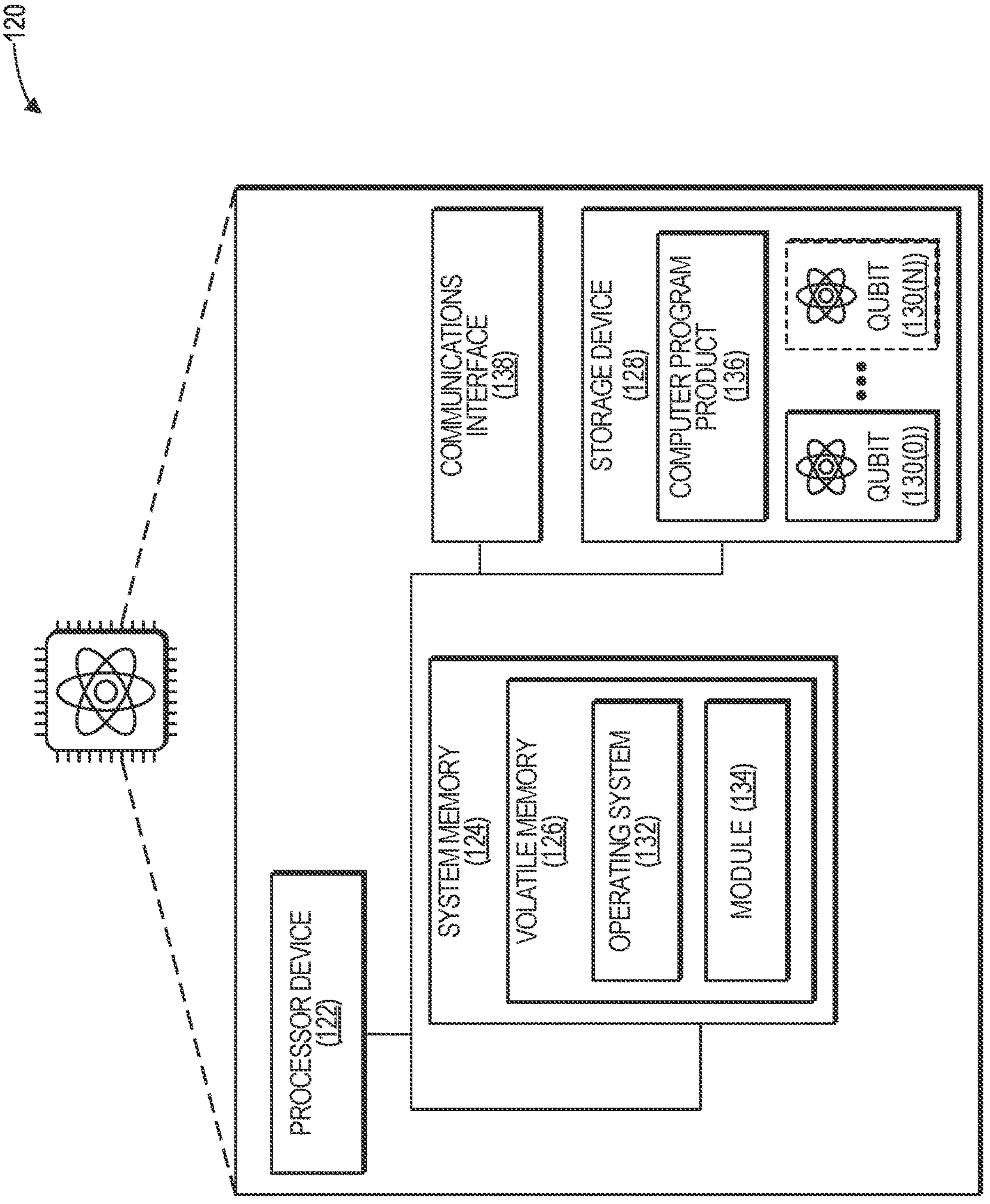
FIG. 5 is a block diagram of a quantum computing device suitable for implementing examples, according to one example.

FIG. 5 is a block diagram of a quantum computing device 120, such as the quantum computing device 18 of FIG. 1, suitable for implementing examples according to one example. The quantum computing device 120 may comprise any suitable quantum computing device or devices. The quantum computing device 120 can operate using classical computing principles or quantum computing principles. When using quantum computing principles, the quantum computing device 120 performs computations that utilize quantum-mechanical phenomena, such as superposition and entanglement. The quantum computing device 120 may operate under certain environmental conditions, such as at or near zero degrees (0°) Kelvin. When using classical computing principles, the quantum computing device 120 utilizes binary digits that have a value of either zero (0) or one (1).

The quantum computing device 120 includes a processor device 122 and a system memory 124. The processor device 122 can be any commercially available or proprietary processor suitable for operating in a quantum environment. The system memory 124 may include volatile memory 126 (e.g., random-access memory (RAM)). The quantum computing device 120 may further include or be coupled to a non-transitory computer-readable medium such as a storage device 128. The storage device 128 and other drives associated with computer-readable media and computer-usable media may provide non-volatile storage of data, data structures, computer-executable instructions, and the like. The storage device may also provide functionality for storing one or more qubits 130(0)-130(N).

A number of modules can be stored in the storage device 128 and in the volatile memory 126, including an operating system 132 and a module 134. All or a portion of the examples may be implemented as a computer program product 136 stored on a transitory or non-transitory computer-usable or computer-readable medium, such as the storage device 128, which includes complex programming instructions, such as complex computer-readable program code, to cause the processor device 122 to carry out the steps described herein. Thus, the computer-readable program code can comprise computer-executable instructions for implementing the functionality of the examples described herein when executed on the processor device 122.

An operator may also be able to enter one or more configuration commands through a keyboard (not illustrated), a pointing device such as a mouse (not illustrated), or a touch-sensitive surface such as a display device (not illustrated). The quantum computing device 120 may also include a communications interface 138 suitable for communicating with other computing systems, including, in some implementations, classical computing devices.

Figure 6:
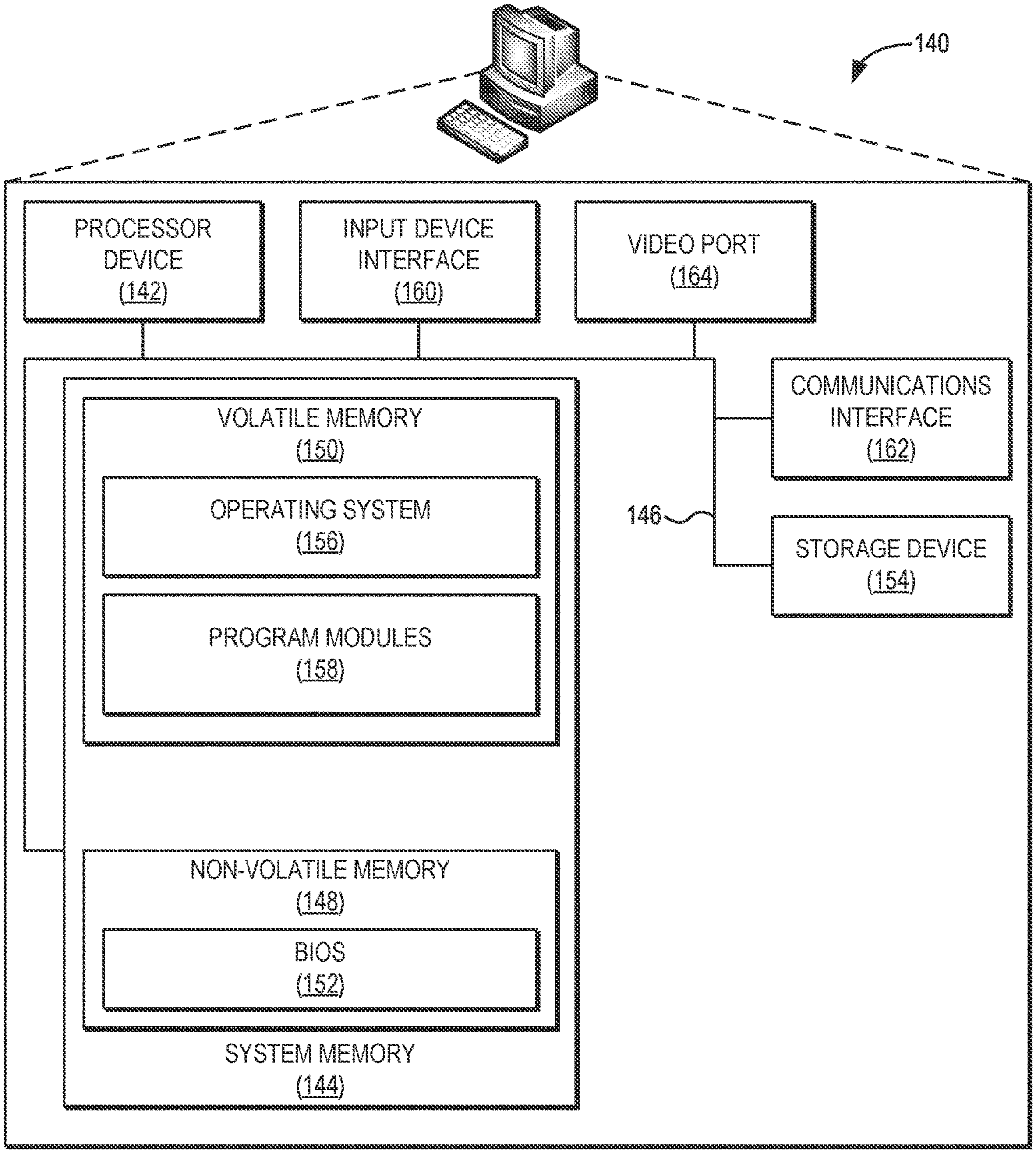
FIG. 6 is a block diagram of a classical computing device suitable for implementing examples, according to one example.

FIG. 6 is a block diagram of a processor-based computing device 140 ("computing device 140" or "classical computing device 140"), such as the classical computing device 12 of FIG. 1 in some examples, suitable for implementing examples according to one example. The computing device 140 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 140 includes a processor device 142, a system memory 144, and a system bus 146. The system bus 146 provides an interface for system components including, but not limited to, the system memory 144 and the processor device 142. The processor device 142 can be any commercially available or proprietary processor.

The system bus 146 may be any of several types of bus structures that may further interconnect to a memory bus (with or without a memory controller), a peripheral bus, and/or a local bus using any of a variety of commercially available bus architectures. The system memory 144 may include non-volatile memory 148 (e.g., read-only memory (ROM), erasable programmable ROM (EPROM), electrically EPROM (EEPROM), etc.), and volatile memory 150 (e.g., RAM). A basic input/output system (BIOS) 152 may be stored in the non-volatile memory 148 and can include the basic routines that help to transfer information among elements within the computing device 140. The volatile memory 150 may also include a high-speed RAM, such as static RAM, for caching data.

The computing device 140 may further include or be coupled to a non-transitory computer-readable storage medium such as a storage device 154, which may comprise, for example, an internal or external hard disk drive (HDD) (e.g., enhanced integrated drive electronics (EIDE) or serial advanced technology attachment (SATA)), for storage, flash memory, or the like. The storage device 154 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 154 and in the volatile memory 150, including an operating system 156 and one or more program modules 158 (e.g., the QCP service 40 of FIG. 1) which may implement the functionality described herein in whole or in part. It is to be appreciated that the examples can be implemented with various commercially available operating systems 156 or combinations of operating systems 156. All or a portion of the examples may be implemented as a computer program product stored on a transitory or non-transitory computer-usable or computer-readable storage medium, such as the storage device 154, which includes complex programming instructions, such as complex computer-readable program code, to cause the processor device 142 to carry out the steps described herein. Thus, the computer-readable program code can comprise software instructions for implementing the functionality of the examples described herein when executed on the processor device 142. The processor device 142 may serve as a controller, or control system, for the computing device 140 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 142 through an input device interface 160 that is coupled to the system bus 146 but can be connected by other interfaces, such as a parallel port, an Institute of Electrical and Electronic Engineers (IEEE) 1394 serial port, a Universal Serial Bus (USB) port, an IR interface, and the like.

The computing device 140 may also include a communications interface 162 suitable for communicating with a network as appropriate or desired. The computing device 140 may also include a video port 164 to interface with a display device to provide information to a user.

Individuals will recognize improvements and modifications to the preferred examples of the disclosure. All such improvements and modifications are considered within the scope of the concepts disclosed herein and the claims that follow.

What is claimed is:

1. A method, comprising:

identifying, by a classical computing device, a quantum computing device communicatively coupled to the classical computing device;

obtaining, by the classical computing device, quantum computing device metadata for the quantum computing device;

identifying, by the classical computing device based on the quantum computing device metadata, one or more quantum services provided by the quantum computing device; and generating, by the classical computing device, a quantum computing device (QCD) profile for the quantum computing device, a QCD access Application Programming Interface (API) for the quantum computing device, and one or more quantum service APIs corresponding to the one or more quantum services.

2. The method of claim 1, wherein the quantum computing device metadata comprises an identification of a quantum service of the one or more quantum services, an indication of a current availability of a quantum resource, a route between the classical computing device and the quantum computing device, a current availability of a processing resource of the quantum computing device, or a current availability of a hardware resource of the quantum computing device.

3. The method of claim 1, further comprising:

binding, by the classical computing device, an application to be executed on the classical computing device with a quantum service API of the one or more quantum service APIs;

upon executing the application, receiving, by the classical computing device, a request from the application via the quantum service API; and transmitting, by the classical computing device, the request to a quantum service corresponding to the quantum service API.

4. The method of claim 3, further comprising:

receiving, by the classical computing device, a response from the quantum service; and transmitting, by the classical computing device, the response to the application.

5. The method of claim 3, wherein:

the quantum computing device providing the quantum service is one of a plurality of quantum computing devices; and the request comprises an identification of the quantum computing device selected by the application to service the request.

6. The method of claim 3, wherein:

the quantum computing device providing the quantum service is one of a plurality of quantum computing devices; and the method further comprises, prior to transmitting the request, selecting, by the classical computing device, the quantum computing device to service the request based on the QCD profile.

7. The method of claim 1, further comprising:

detecting, by the classical computing device, a change in a configuration of the quantum computing device; and responsive to detecting the change:

obtaining, by the classical computing device, updated quantum computing device metadata from the quantum computing device; and updating, by the classical computing device, one or more of the QCD profile, the QCD access API, or the one or more quantum service APIs based on the updated quantum computing device metadata.

8. The method of claim 7, wherein obtaining the updated quantum computing device metadata for the quantum computing device comprises receiving the updated quantum computing device metadata from one or more of a quantum task manager, a quantum service scheduler, or a qubit registry of the quantum computing device.

9. The method of claim 1, wherein identifying, by the classical computing device based on the quantum computing device metadata, the one or more quantum services provided by the quantum computing device comprises:

querying, by the classical computing device, an operating system of the quantum computing device for information associated with a first quantum service of the one or more quantum services; and wherein generating the one or more quantum service APIs corresponding to the one or more quantum services comprises generating, by the classical computing device based on the information associated with the first quantum service, a first quantum service API of the one or more quantum service APIs, the first quantum service API corresponding to the first quantum service.

10. A computing system, comprising a classical computing device comprising:

a system memory; and a processor device communicatively coupled to the system memory, the processor device to:

identify a quantum computing device communicatively coupled to the classical computing device;

obtain quantum computing device metadata for the quantum computing device;

identify, based on the quantum computing device metadata, one or more quantum services provided by the quantum computing device; and generate a quantum computing device (QCD) profile for the quantum computing device, a QCD access Application Programming Interface (API) for the quantum computing device, and one or more quantum service APIs corresponding to the one or more quantum services.

11. The computing system of claim 10, wherein the quantum computing device metadata comprises an identification of a quantum service of the one or more quantum services, an indication of a current availability of a quantum resource, a route between the classical computing device and the quantum computing device, a current availability of a processing resource of the quantum computing device, or a current availability of a hardware resource of the quantum computing device.

12. The computing system of claim 10, wherein the processor device is further to:

bind an application to be executed on the classical computing device with a quantum service API of the one or more quantum service APIs;

upon executing the application, receive a request from the application via the quantum service API; and transmit the request to a quantum service corresponding to the quantum service API.

13. The computing system of claim 12, wherein the processor device is further to:

receive a response from the quantum service; and transmit the response to the application.

14. The computing system of claim 12, wherein:

the quantum computing device providing the quantum service is one of a plurality of quantum computing devices; and the request comprises an identification of the quantum computing device selected by the application to service the request.

15. The computing system of claim 12, wherein:

the quantum computing device providing the quantum service is one of a plurality of quantum computing devices; and the processor device is further to, prior to transmitting the request, select the quantum computing device to service the request based on the QCD profile.

16. The computing system of claim 10, wherein the processor device is further to:

detect a change in a configuration of the quantum computing device; and responsive to detecting the change:

obtain updated quantum computing device metadata from the quantum computing device; and update one or more of the QCD profile, the QCD access API, or the one or more quantum service APIs based on the updated quantum computing device metadata.

17. The computing system of claim 16, wherein to obtain the updated quantum computing device metadata for the quantum computing device is to receive the updated quantum computing device metadata from one or more of a quantum task manager, a quantum service scheduler, or a qubit registry of the quantum computing device.

18. The computing system of claim 17, wherein to receive the updated quantum computing device metadata is to receive the updated quantum computing device metadata in response to a query from the classical computing device.

19. A non-transitory computer-readable medium having stored thereon computer-executable instructions that, when executed, cause one or more processor devices to:

identify a quantum computing device communicatively coupled to a classical computing device;

obtain quantum computing device metadata for the quantum computing device;

identify, based on the quantum computing device metadata, one or more quantum services provided by the quantum computing device; and generate a quantum computing device (QCD) profile for the quantum computing device, a QCD access Application Programming Interface (API) for the quantum computing device, and one or more quantum service APIs corresponding to the one or more quantum services.

20. The non-transitory computer-readable medium of claim 19, wherein the computer-executable instructions further cause the one or more processor devices to:

bind an application to be executed on the classical computing device with a quantum service API of the one or more quantum service APIs;

upon executing the application, receive a request from the application via the quantum service API; and transmit the request to a quantum service corresponding to the quantum service API.

* * * * *